US012394898B2

(12) United States Patent
Tai et al.

(10) Patent No.: US 12,394,898 B2
(45) Date of Patent: Aug. 19, 2025

(54) ANTENNA STRUCTURE

(71) Applicant: Wistron NeWeb Corp., Hsinchu (TW)

(72) Inventors: Chih-Feng Tai, Hsinchu (TW); Tzu-Chi Lu, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 188 days.

(21) Appl. No.: 18/354,940

(22) Filed: Jul. 19, 2023

(65) Prior Publication Data

US 2024/0072445 A1 Feb. 29, 2024

(30) Foreign Application Priority Data

Aug. 23, 2022 (TW) .................................. 111131589

(51) Int. Cl.
*H01Q 5/371* (2015.01)
*H01Q 9/42* (2006.01)

(52) U.S. Cl.
CPC ............... *H01Q 5/371* (2015.01); *H01Q 9/42* (2013.01)

(58) Field of Classification Search
CPC ........ H01Q 5/307; H01Q 5/342; H01Q 5/357; H01Q 5/364; H01Q 5/371
See application file for complete search history.

(56) References Cited

U.S. PATENT DOCUMENTS

2014/0009342 A1* 1/2014 Wei ........................ H01Q 21/28 343/700 MS
2021/0399422 A1* 12/2021 Fang ........................ H01Q 1/38

* cited by examiner

*Primary Examiner* — Daniel Munoz
(74) *Attorney, Agent, or Firm* — McClure, Qualey & Rodack, LLP

(57) ABSTRACT

An antenna structure includes a ground element, a first radiation element, a second radiation element, a third radiation element, a fourth radiation element, a fifth radiation element, and a dielectric substrate. The first radiation element has a feeding point. The first radiation element is coupled through the second radiation element to the ground element. The third radiation element is coupled to the first radiation element and the second radiation element. The fourth radiation element is coupled to the first radiation element and the third radiation element. The fifth radiation element is coupled to the ground element. The fifth radiation element is adjacent to the fourth radiation element. The ground element, the first radiation element, the second radiation element, the third radiation element, the fourth radiation element, and the fifth radiation element are disposed on the dielectric substrate.

18 Claims, 3 Drawing Sheets

100

ANTENNA STRUCTURE

CROSS REFERENCE TO RELATED APPLICATIONS

This application claims priority of Taiwan Patent Application No. 111131589 filed on Aug. 23, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna element.

BRIEF SUMMARY OF THE INVENTION

In an exemplary embodiment, the invention is directed to an antenna structure that includes a ground element, a first radiation element, a second radiation element, a third radiation element, a fourth radiation element, a fifth radiation element, and a dielectric substrate. The first radiation element has a feeding point. The first radiation element is coupled through the second radiation element to the ground element. The third radiation element is coupled to the first radiation element and the second radiation element. The fourth radiation element is coupled to the first radiation element and the third radiation element. The fifth radiation element is coupled to the ground element. The fifth radiation element is adjacent to the fourth radiation element. The ground element, the first radiation element, the second radiation element, the third radiation element, the fourth radiation element, and the fifth radiation element are disposed on the dielectric substrate.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
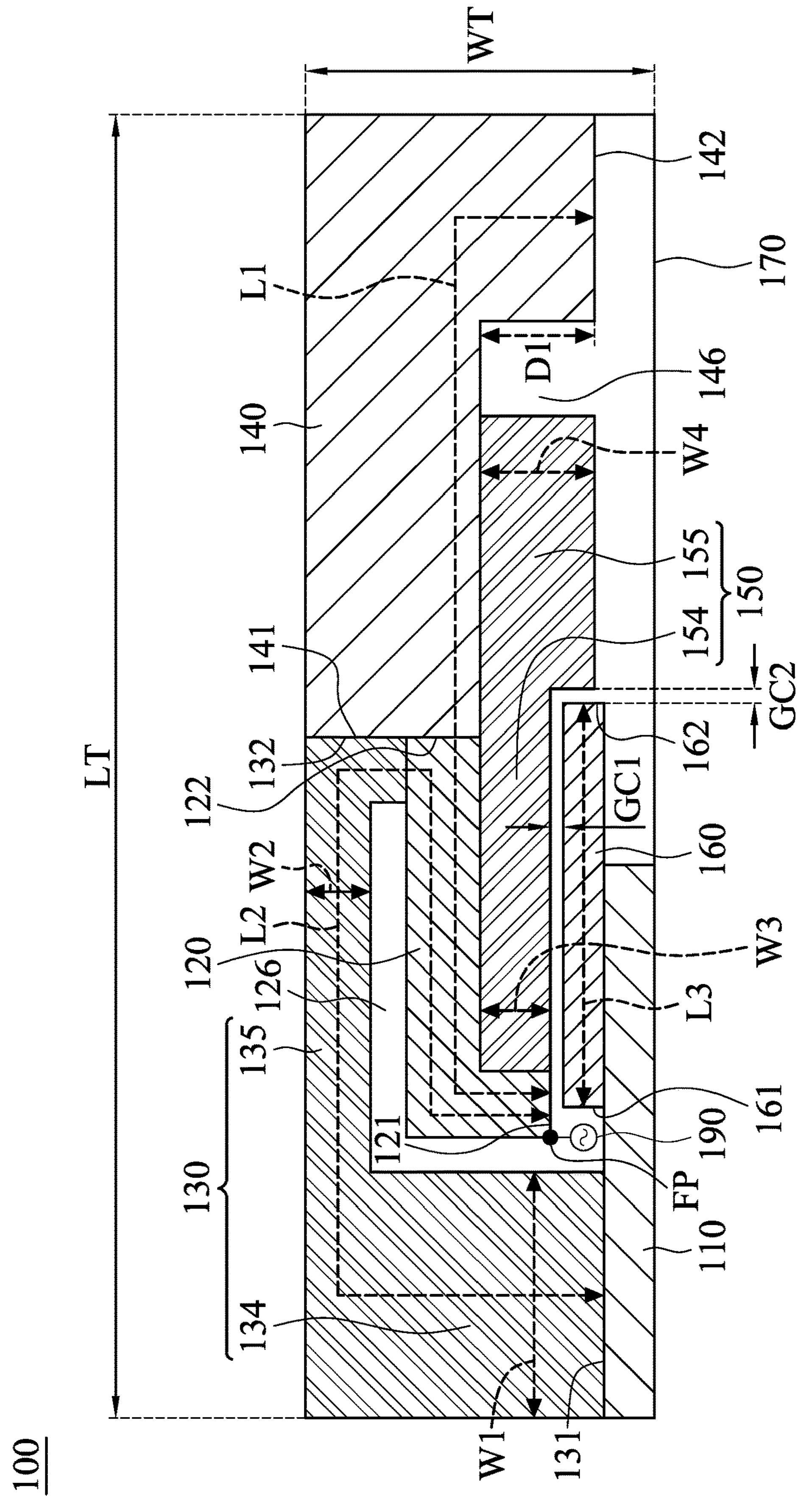
FIG. 1 is a top view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of an antenna structure 100 according to an embodiment of the invention. The antenna structure 100 may be applied to a mobile device, such as a smart phone, a tablet computer, or a notebook computer. In the embodiment of FIG. 1, the antenna structure 100 at least includes a ground element 110, a first radiation element 120, a second radiation element 130, a third radiation element 140, a fourth radiation element 150, a fifth radiation element 160, and a dielectric substrate 170. The ground element 110, the first radiation element 120, the second radiation element 130, the third radiation element 140, the fourth radiation element 150, and the fifth radiation element 160 may all be made of metal materials, such as copper, silver, aluminum, iron, or their alloys.

The ground element 110 provides a ground voltage. For example, the ground element 110 may be implemented with a ground copper foil. In some embodiments, the ground element 110 is further coupled to a system ground plane (not shown).

The first radiation element 120 has a first end 121 and a second end 122. A feeding point FP is positioned at the first end 121 of the first radiation element 120. The feeding point FP may be further coupled to a signal source 190, such as an RF (Radio Frequency) module, for exciting the antenna structure 100. In some embodiments, the first radiation element 120 may substantially have a relatively small L-shape.

The second radiation element 130 has a first end 131 and a second end 132. The first end 131 of the second radiation element 130 is coupled to the ground element 110. The second end 132 of the second radiation element 130 is coupled to the second end 122 of the first radiation element 120. Thus, the first radiation element 120 is coupled through the second radiation element 130 to the ground element 110. In some embodiments, the second radiation element 130 may substantially have an inverted U-shape. A non-metal slot region 126 is formed between the first radiation element 120 and the second radiation element 130. For example, the slot region 126 may substantially have an L-shape, but it is not limited thereto. In some embodiments, the second radiation element 130 includes a first wide portion 134 adjacent to the first end 131 and a first narrow portion 135 adjacent to the second end 132, and the first narrow portion 135 is coupled through the first wide portion 134 to the ground element 110. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

The third radiation element 140 has a first end 141 and a second end 142. The first end 141 of the third radiation element 140 is coupled to the second end 122 of the first radiation element 120 and the third end 132 of the second radiation element 130. The second end 142 of the third radiation element 140 is an open end. For example, the first end 131 of the second radiation element 130 and the second end 142 of the third radiation element 140 may substantially extend in the same direction. In some embodiments, the third radiation element 140 may substantially have a relatively large L-shape (compared with the first radiation element 120).

The fourth radiation element 150 is coupled to the first radiation element 120 and the third radiation element 140. Specifically, the fourth radiation element 150 includes a second narrow portion 154 and a second wide portion 155. In some embodiments, the fourth radiation element 150 may substantially have a variable-width straight-line shape. A non-metal notch region 146 is defined by the third radiation element 140 and the fourth radiation element 150. For example, the notch region 146 may substantially have a rectangular shape or a square shape, but it is not limited thereto.

The fifth radiation element 160 is adjacent to the fourth radiation element 150, but the fifth radiation element 160 is separate from the fourth radiation element 150. Specifically, the fifth radiation element 160 has a first end 161 and a second end 162. The first end 161 of the fifth radiation element 160 is coupled to the ground element 110. The second end 162 of the fifth radiation element 160 is an open end. In some embodiments, fifth radiation element 160 may substantially have an equal-width straight-line shape. A first coupling gap GC1 is formed between the second narrow portion 154 of the fourth radiation element 150 and the fifth radiation element 160. In addition, a second coupling gap GC2 is formed between the second wide portion 155 of the fourth radiation element 150 and the second end 162 of the fifth radiation element 160. In some embodiments, the width of the second coupling gap GC2 is greater than or equal to the width of the first coupling gap GC1.

The dielectric substrate 170 may be an FR4 (Flame Retardant 4) substrate, a PCB (Printed Circuit Board), or an FPC (Flexible Printed Circuit). The ground element 110, the first radiation element 120, the second radiation element 130, the third radiation element 140, the fourth radiation element 150, and the fifth radiation element 160 are all disposed on the same surface of the dielectric substrate 170. The antenna structure 100 may be a planar structure, but the invention is not limited thereto. In alternative embodiments, the antenna structure 100 is modified to a 3D (Three-Dimensional) structure, and it is formed on any support element by using LDS (Laser Direct Structuring) technology (not shown).

Figure 2:
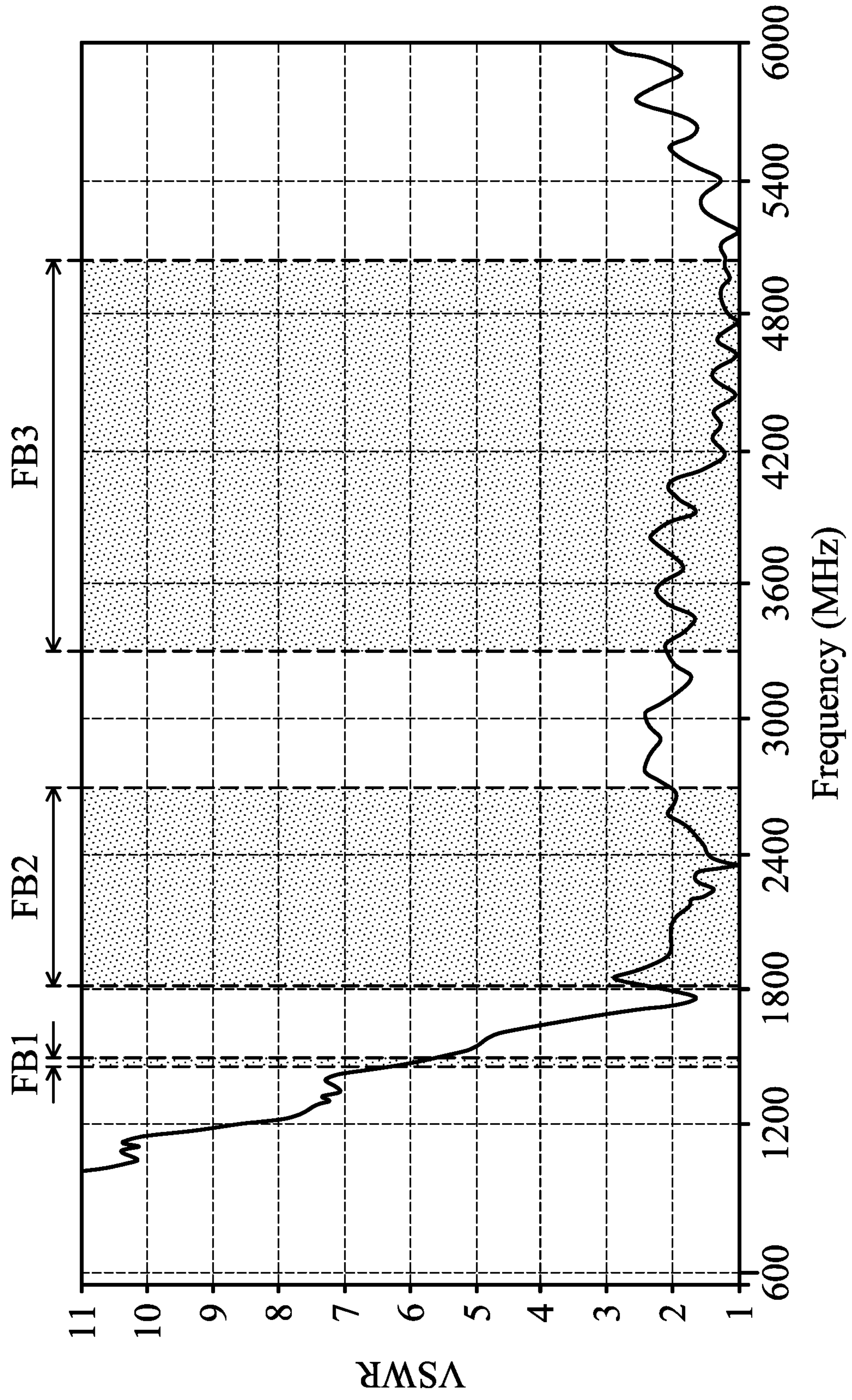
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, the antenna structure 100 can cover a first frequency band FB1, a second frequency band FB2, and a third frequency band FB3. For example, the first frequency band FB1 may be from 1452 MHz to 1496 MHz, the second frequency band FB2 may be from 1805 MHz to 2690 MHz, and the third frequency band FB3 may be from 3300 MHz to 5000 MHz. Therefore, the antenna structure 100 can support at least the wideband operations of WWAN (Wireless Wide Area Network) and the next 5G (5th Generation Wireless System).

In some embodiments, the operational principles of the antenna structure 100 will be described as follows. The first radiation element 120 and the third radiation element 140 are excited to generate a fundamental resonant mode, thereby forming the first frequency band FB1. Furthermore, the first radiation element 120 and the third radiation element 140 are excited to generate a higher-order resonant mode, thereby forming the second frequency band FB2. The first radiation element 120 and the second radiation element 130 are excited to generate the third frequency band FB3. The fourth radiation element 150 is configured to fine-tune the impedance matching of the third frequency band FB3. According to practical measurements, the incorporation of the fifth radiation element 160 can improve the frequency shift of the first frequency band FB1, the second frequency band FB2, and the third frequency band FB3. In alternative embodiments, the fourth radiation element 150 is further excited to generate a frequency interval from 5000 MHz to 6000 MHz, so as to increase the operational bandwidth of the antenna structure 100.

Figure 3:
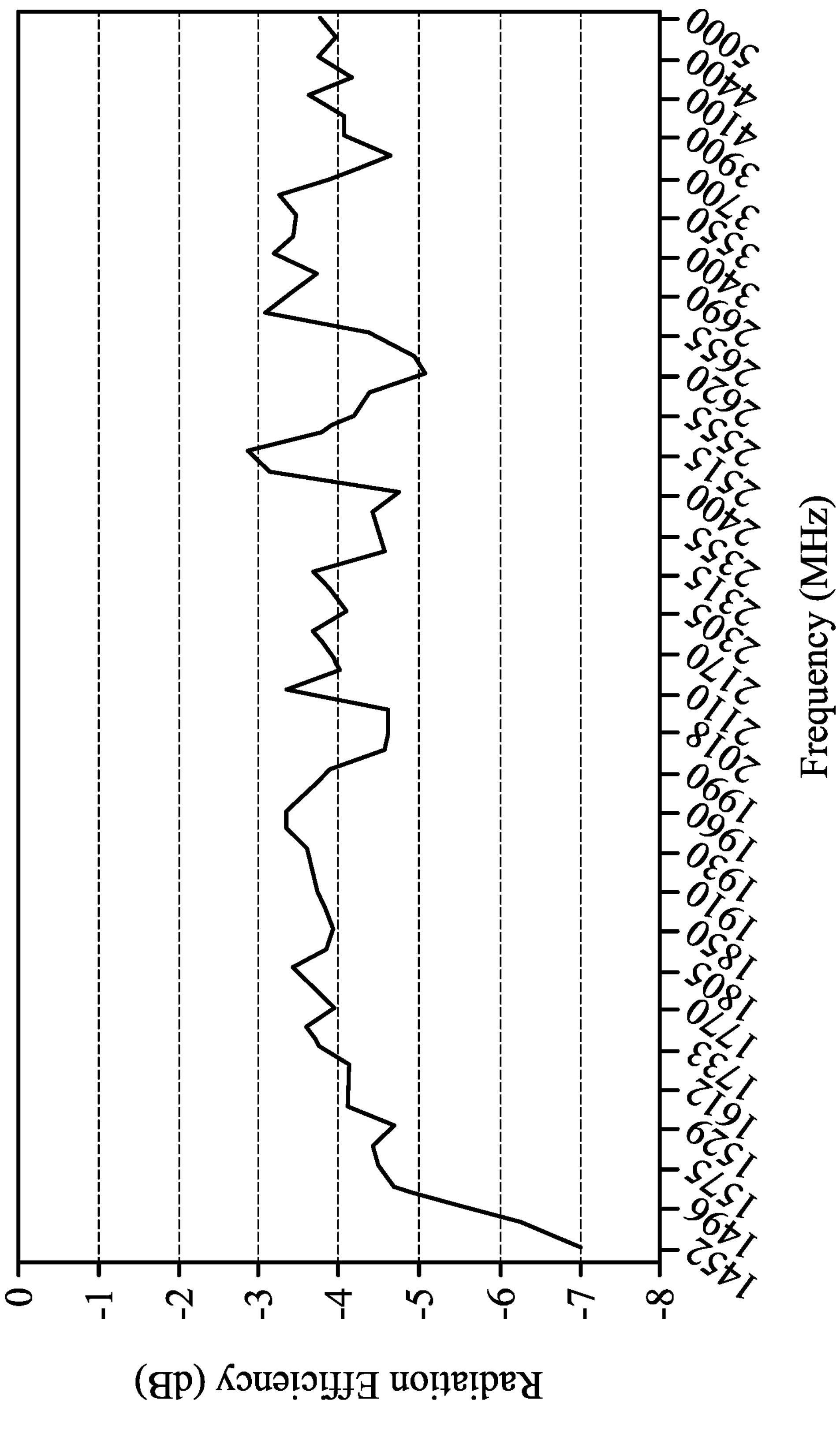
FIG. 3 is a diagram of radiation efficiency of an antenna structure according to an embodiment of the invention.

FIG. 3 is a diagram of radiation efficiency of the antenna structure 100 according to an embodiment of the invention. The horizontal axis represents the operational frequency (MHz), and the vertical axis represents the radiation efficiency (dB). According to the measurement of FIG. 3, the radiation efficiency of the antenna structure 100 operating within the first frequency band FB1 can be from −5 dB to −7 dB, and the radiation efficiency of the antenna structure 100 operating within the second frequency band FB2 and the third frequency band FB3 can be at least −5 dB or higher. It can meet the requirements of practical applications of general mobile communication devices.

In some embodiments, the element sizes of the antenna structure 100 will be described as follows. The total length L1 of the first radiation element 120 and the third radiation element 140 may be from 0.2 to 0.3 wavelength (0.2λ-0.3λ) of the first frequency band FB1 of the antenna structure 100. The total length L2 of the first radiation element 120 and the second radiation element 130 may be from 0.4 to 0.6 wavelength (0.4λ-0.6λ) of the third frequency band FB3 of the antenna structure 100. In the second radiation element 130, the width W1 of the first wide portion 134 may be from 4 mm to 7 mm, and the width W2 of the first narrow portion 135 may be from 1 mm to 3 mm. In the fourth radiation element 150, the width W3 of the second narrow portion 154 may be from 1.5 mm to 2.5 mm, and the width W4 of the second wide portion 155 may be from 2.5 mm to 3.5 mm. The length L3 of the fifth radiation element 160 may be from 0.1 to 0.2 wavelength (0.1λ-0.2λ) of the third frequency band FB3 of the antenna structure 100. The width of the first coupling gap GC1 may be from 0.2 mm to 1.2 mm. The width of the second coupling gap GC2 may be from 0.2 mm to 3.2 mm. The depth D1 of the notch region 146 may be from 2 mm to 3 mm. The total length LT of the antenna structure 100 may be about 30 mm. The total width WT of the antenna structure 100 may be about 8 mm. The above ranges of element sizes and parameters are calculated and obtained according to many experiment results, and they help to optimize the operational bandwidth and impedance matching of the antenna structure 100.

The invention proposes a novel antenna structure. The invention has such advantages as a smaller size, wider bandwidth, and lower manufacturing cost than the conventional design. Therefore, the invention is suitable for application in a variety of mobile communication devices.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-3. The invention may merely include any one or more features of any one or more embodiments of FIGS. 1-3. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
a ground element;
a first radiation element, having a feeding point;
a second radiation element, wherein the first radiation element is coupled through the second radiation element to the ground element;
a third radiation element, coupled to the first radiation element and the second radiation element;
a fourth radiation element, coupled to the first radiation element and the third radiation element;
a fifth radiation element, coupled to the ground element, wherein the fifth radiation element is adjacent to the fourth radiation element; and
a dielectric substrate, wherein the ground element, the first radiation element, the second radiation element, the third radiation element, the fourth radiation element, and the fifth radiation element are disposed on the dielectric substrate;
wherein the fourth radiation element substantially has a variable-width straight-line shape and comprises a second wide portion and a second narrow portion;
wherein a first coupling gap is formed between the second narrow portion of the fourth radiation element and the fifth radiation element.

2. The antenna structure as claimed in claim 1, wherein the first radiation element substantially has a relatively small L-shape.

3. The antenna structure as claimed in claim 1, wherein the second radiation element substantially has an inverted U-shape.

4. The antenna structure as claimed in claim 1, wherein a slot region is formed between the first radiation element and the second radiation element.

5. The antenna structure as claimed in claim 4, wherein the slot region substantially has an L-shape.

6. The antenna structure as claimed in claim 1, wherein the second radiation element comprises a first wide portion and a first narrow portion, and the first narrow portion is coupled through the first wide portion to the ground element.

7. The antenna structure as claimed in claim 1, wherein the third radiation element substantially has a relatively large L-shape.

8. The antenna structure as claimed in claim 1, wherein a notch region is defined by the third radiation element and the fourth radiation element.

9. The antenna structure as claimed in claim 8, wherein the notch region substantially has a rectangular shape.

10. The antenna structure as claimed in claim 1, wherein the fifth radiation element substantially has an equal-width straight-line shape.

11. The antenna structure as claimed in claim 1, wherein a width of the first coupling gap is from 0.2 mm to 1.2 mm.

12. The antenna structure as claimed in claim 1, wherein a second coupling gap is formed between the second wide portion of the fourth radiation element and the fifth radiation element.

13. The antenna structure as claimed in claim 12, wherein a width of the second coupling gap is from 0.2 mm to 3.2 mm.

14. The antenna structure as claimed in claim 1, wherein the antenna structure covers a first frequency band, a second frequency band, and a third frequency band.

15. The antenna structure as claimed in claim 14, wherein the first frequency band is from 1452 MHz to 1496 MHz, the second frequency band is from 1805 MHz to 2690 MHz, and the third frequency band is from 3300 MHz to 5000 MHz.

16. The antenna structure as claimed in claim 14, wherein a total length of the first radiation element and the third radiation element is from 0.2 to 0.3 wavelength of the first frequency band.

17. The antenna structure as claimed in claim 14, wherein a total length of the first radiation element and the second radiation element is from 0.4 to 0.6 wavelength of the third frequency band.

18. The antenna structure as claimed in claim 14, wherein a length of the fifth radiation element is from 0.1 to 0.2 wavelength of the third frequency band.

* * * * *